July 29, 1969  H. BEHR  3,458,137
APPARATUS FOR SELECTIVE VOLATILIZATION AND APPLICATION
OF DIFFERENT SUBSTANCES
Original Filed Aug. 17, 1965  3 Sheets-Sheet 1
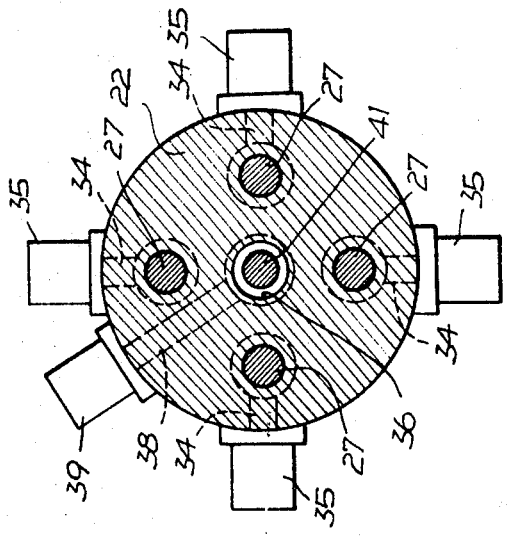
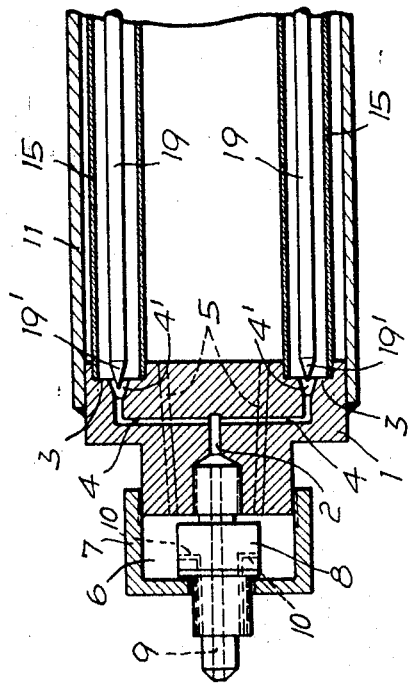
Inventor:
Hans Behr
Roy Ernest Montague
attorney

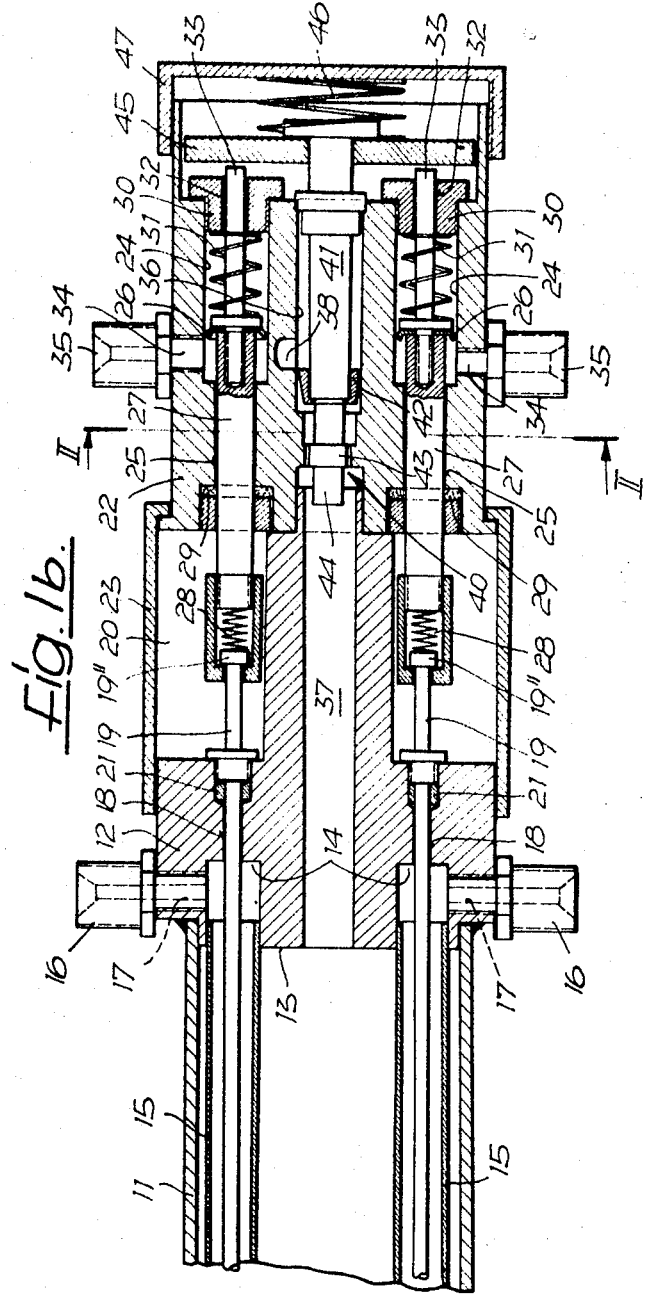

United States Patent Office 3,458,137
Patented July 29, 1969

3,458,137
**APPARATUS FOR SELECTIVE VOLATILIZA-
TION AND APPLICATION OF DIFFERENT
SUBSTANCES**
Hans Behr, Lenzhalde 82, Stuttgart, Germany
Continuation of application Ser. No. 480,413, Aug. 17, 1965. This application Dec. 22, 1967, Ser. No. 692,802
Claims priority, application Germany, Aug. 17, 1964,
B 78,121
Int. Cl. B05b 7/08
U.S. Cl. 239—414                              7 Claims

ABSTRACT OF THE DISCLOSURE

An apparatus for selective volatilization and application of different substances, particularly of powdered or liquid substances of different colors, which comprises a nozzle head including at least one first nozzle for atomizing air and at least one second nozzle for the outlet of the substances to be atomized. A plurality of feeding conduits are provided for different substances selectively connectable with the second nozzle. A feeding channel is coordinated and connected to the corresponding of the feeding conduits and operatively communicate with the second nozzle. Means including control valves, the latter each including a piston, are provided for selectively opening at least one of the feeding channels and leaving the remaining channels closed. An atomizing air feeding conduit communicates with the first nozzle, and a valve is disposed in the latter including a spindle. Means are provided for coupling each of the pistons with the spindle for simultaneous operation of the valve therewith, regardless of the position of the other pistons. The nozzle head defines a bore which communicates with the feeding channels and with the second nozzle, and the bore and the first nozzle receiving substantially simultaneously selectively feed of material from at least one of the feeding conduits and feed of atomizing air, respectively.

---

This application is a continuation of my co-pending patent application Ser. No. 480,413, filed Aug. 17, 1965.

The present invention relates to an apparatus for the selective volatilization and application of different substances, in particular of powdered and liquid substances of different colors, wherein at least one nozzle is provided for atomizer air and one nozzle for the delivery of the substance to be volatilized in a nozzle head, which nozzles are selectively connected with feeding conduits for the different substances.

Devices of this type are known in different embodiments as spraying pistols or atomizers for the application of color. In one of these known devices a connection flange is provided on the pistol body, on which connection flange that feeding hose is connected manually, which carries the color with the desired tone. Upon change of the color tone, thus the feeding hose must be likewise manually changed. As a pistol for automatic spraying devices and as atomizers for electrostatic spraying, this device is thus not applicable. Yet even in non-automatically operated spraying devices, the comparatively long adjustment time from one color tone to another and the color loss are of a disadvantage. The color disposed in the connecting channel between the connecting flange and the color nozzle is lost.

In another known device, a long connecting hose of a length of several meters is connected with the connecting flange of the color channel, which connecting hose leads to a color selecting device, where it is connected to different feeding conduits by displacement of a slide or rotation of a magazine. The color selecting device can be controlled automatically, so that no labor is required for the color change. For this reason, the embodiment is also applicable for electrostatic spraying. It is a disadvantage, however, that because of the long connecting hose, a large amount of color is lost upon a color change. Furthermore, the color change still takes an appreciable time period in spite of the fast adjusting ability of the color selecting device, since the old color must first be pushed out from the connecting hose and the color channel, before the new color may be sprayed. In some instances, it is even necessary in case of a color change to flush out the connecting hose and the color channel. For automatic operating spraying and lacquering devices, in which the cycle permits only a small time period for the color change, this device is, thus, not suitable.

It is, therefore, one object of the present invention to provide an apparatus for the selective volatilization and application of different substances, wherein the automatic controllable change from one substance to another is possible with the least possible losses and shortest possible time.

It is another object of the present invention to provide an apparatus for the selective volatilization and application of different substances, wherein, for the connection of the different feeding conduits with the substance nozzle, feeding channels are provided, which are selectively closed by control valves and which terminate into a passing chamber in communication with and disposed adjacent to the substance nozzle.

Due to the fact, that the feeding channels terminates in a passing chamber disposed adjacent the substance nozzle, the path used jointly for the different substances is extremely short. In case of a substance change, only the quantity of the material which is disposed in this portion of the channel is lost, since the control valves prevent, in their closed position, the entrance of the substance from the coordinated feeding channels into the passing chamber. The loss is, thus, negligibly small. Also the adjustment time is very short, since only the control valve of the one feeding channel is to be closed and a control valve of another feeding channel is to be opened, which operation can take place by means of an automatic control. As an automatic spraying pistol, as well as an atomizer this apparatus suffices for all practical requirements, and also in relation to the number of the different color tones, which is limited only by the number of the feeding channels, which can be provided in the pistol body or in the atomizer body.

Suitably, the control valves are disposed adjacent the end of the channels opposite the substance nozzle. By this arrangement the quantity of the substances in the portion of the channel between the valve and the passing chamber is very small. This quantity of the substances flows, during the working of a thin liquid substance, finally after the closing of the valve into the passing chamber.

It is still another object of the present invention to provide an apparatus for the selective volatilization and application of different substances, wherein each feeding channel comprises at least a part channel in a head receiving the substance nozzle and a tube, which connects the partial channel with a connecting flange. By this arrangement, a particularly simple structure results. Also by this arrangement, a very simple and advantageous embodiment permits the end of the partial channel pointing to the tube to form the seat of a valve, the valve spindle of which extends through the tube.

In particular, the structure is arranged such, that the valve spindles formed as needles in known manner are displaceable by means of an air operable piston against the force of a spring. The control of the air feed to the piston can be made automatically, for instance in accordance with a predetermined program.

It is yet another object of the present invention to provide an apparatus for the selective volatilization and application of different substances, wherein, in order not to require a separate control for the feeding of the atomizer air, which could lead to synchronization errors, each piston can be coupled with the spindle of a valve disposed in the atomizer air conduit for substantially simultaneous operation of the latter independently from the position of the other pistons. In a particularly advantageous embodiment, a coupling device is provided for this purpose, which is equipped with a plate disposed axially immovably on the spindle of the atomizer air valve, and a return spring for the spindle and rods or the like, which are axially immovable and connected with the pistons, as well as engageable with the plate. In order to assure that the atomizer air valve always is opened before the substance feeding valves are opened, and always is closed only after the substance feeding valves are closed, each piston can be connected by means of a spring with a coordinated needle with a time delay retardation.

With these and other objects in view, which will become apparent in the following detailed description, the present invention will be clearly understood in connection with the accompanying drawings, in which:

FIG. 1a is a longitudinal section of the head of the apparatus designed in accordance with the present invention;

FIG. 1b is a longitudinal section of the body of the apparatus designed in accordance with the present invention;

FIG. 2 is a section along the lines 2—2 of FIG. 1b; and

Figure 3:
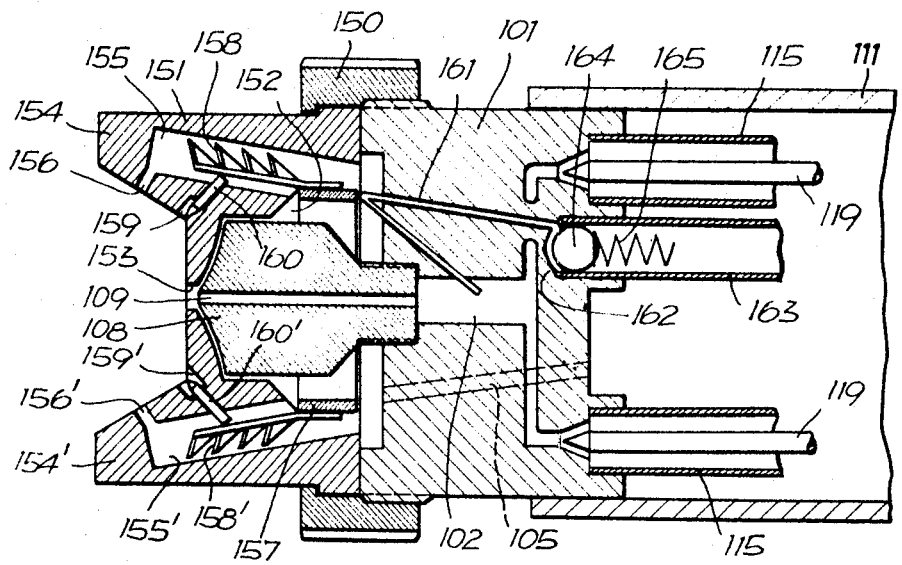
FIG. 3 is a fragmentary longitudinal section of a second embodiment of the apparatus designed in accordance with the present invention.

Referring now to the drawings, and in particular to FIGS. 1a, 1b and 2, the apparatus comprises a cylindrical nozzle stock 1 of an automatic spraying pistol in which a concentric bore 2 is provided. The nozzle stock 1 has at the end face remote from the bore 2 at equal distance from the outer edge four cylindrical recesses 3 set off for 90° relative to each other, feeding channels 4 communicating with the bore 2 terminating in the recesses 3. The mouth opening 4' of the feeding channels 4 is widened in form of a funnel. The diameter of the recesses 3 is appreciably larger than the diameter of the feeding channels 4 and of the bore 2. Additional bores 5 disposed between the feeding channels 4 penetrate the nozzle stock 1 in an axial direction. They terminate on the side of the bore 2 in a chamber 6 which is defined by a cylindrical bushing 7 mounted on the nozzle stock 1 and equipped with a bottom portion and by the end face of the nozzle stock 1. A color nozzle 8 is disposed in a concentric bore in the bottom portion of the bushing 7 and in a threaded bore disposed concentrically to the bore 2 in the nozzle stock 1, the color nozzle containing a bore 9 coaxially communicating with the bore 2. The color nozzle further contains air channels 10 which are separated from the bore 9 and which air channels 10 communicate chamber 6 with the outlet side of the nozzle 8.

The nozzle stock 1 is secured to one end of a cylindrical tube 11, the other end of which is mounted on a body 12 and is connected therewith. On the end face 13 of the body 12 pointing to the nozzle stock 1, the body 12 is equipped with bores 14, which have the same diameter, the same distance from the longitudinal axis and the same spacial position as the recesses 3. The bores 14 and the recesses 3 pointing towards each other communicate with each other by means of tubes 15. A connecting flange 16 is connected with each bore 14 by means of a radial channel 17.

A guide channel 18 terminates in the center of the end face of each bore 14, in which guide channel 18 a needle 19 is guided, which extends through the tube 15 up to the mouth opening 4'. The end 19' of the needle 19 is conically shaped complementary to the funnel shaped end 4' of the channel 4. The mouth opening 4', the conical end 19' and the needle 19 form the valve seat, the valve cone and the valve spindle of a control valve, respectively.

The other end 19" of each needle 19 is disposed in a cylindrical annular chamber 20, which is defined by the body 12, a cylindrical body 22 connected with the latter and a sleeve 23 which slides over both bodies 12 and 22. The annular chamber 20 is sealed off by means of seals 21 against the bores 14.

The body 22 has bores 24, which extend coaxially to the needles 19 over one portion of the axial length of the body 22, and guide bores 25 follow coaxially up to the annular chamber 20. A piston 26 is movably disposed in each bore 24, which piston 26 is mounted at one end of a bolt 27 guided in the coordinated guide bore 25. The other end of the bolt 27 is conected by means of a spring 28 with the end 19" of the corresponding needle 19. The annular chamber 20 is sealed off relative to the bores 24 by means of seals 29.

A nut 30 is disposed in the end of each bore 24 remote from the guide bore 25. One end of a helical spring 31 abuts the nut 30, while the other end of the spring 31 engages the piston 26. The nuts 30 are equipped with a central bore 32 through which a rod 33 extends, rigidly secured to the piston 26 and the bolt 27. The portion of each bore 24 disposed between the piston 26 and the guide bore 25 is in communication with a connecting flange 35 for the control air by means of a radial channel 34.

The body 22 has further a central bore 36 passing therethrough which continues into a central bore 37 similarly passing through the body 12. The bore 36 is connected with a connecting flange 39 (FIG. 2) by means of a connecting channel 38 disposed radially between the radial channels 34. For the control of the feeding of atomizing air through the bore 37 into the tube 11 and from there into the nozzle stock 1, the bore 36 is equipped with a control valve 40. A closure body 42 is secured to a valve spindle 41 axially displaceable in the bore 36, which closure body 42 depending upon the position of the valve spindle 41 permits either the passage of the atomizer air from the channel 38 into the portion of the bore 36 disposed between the channel 38 and the bore 37 or prevents such passage. This part of the bore 36 is stepwise narrowed. A piston 43 disposed on an extension 44 of the valve spindle 41 cooperates jointly with these narrowed portions as a throttling device, which enlarges stepwise the channel cross-section upon opening of the valve for the atomizer air.

A plate 45 is axially immovable secured on the end of the valve spindle 41, which is remote from the extension 44 of the valve spindle 41, and a pretensioned pressure spring 46 engages the side of the plate 45 which is remote from the closure body 42. The other end of the spring 46 abuts a cap member 47 connected with the body 22. In the closed position of all valves, the free end faces of all rods engage the side of the plate 45 pointing toward the closure body 42 or are slightly spaced apart from this side of the plate 45.

In the feeding of the control air is opened for one of the pistons 26, it displaces the rod 33, whereby the plate 45 and the valve spindle 41 are likewise displaced. The atomizing air can then enter the channel 38 through the bores 36 and 37, through the tube 11 and the bores 5 and 10 in the nozzle stock 1 and in the color nozzle 8, in particular in the nozzle bore 9 in the latter, respectively. Due to the inertia mass of the needle 19 and the connection of the latter with the bolt 27 by means of the spring 28, the needle 19 follows the displacement of the piston 26 with a slight time delay. The feeding of color from the tube 15 into the channel 4 and the bore 2 thus takes place only after the atomizing air already flows through the nozzle bore 9. By this arrangement it is assured that no color drops can escape from the nozzle 8. The remaining pistons 26 are not influenced by the displacement of the piston impinged by the control air. For the termination of the spraying or for the change of color, the control air feeding channel 34 of the piston 26 disposed in the open position is aired. The spring 31 can now return the piston 26 into its original position. The needle 19 follows with a slight time delay and closes the color feeding. The return movement of the closure body 42 into the closing position by the spring 46 takes place with still further time delay, so that the atomizing air can still escape through the nozzle bore 9, after the color feeding has already been closed. By the subatmospheric pressure created thereby, the bore 2 is practically sucked empty over its entire length. This is of advantage for the reason that thereby, at the occasion of a color change, the bore 2 is free of color remainders of the previously worked color tone. In order to change the color, it is merely necessary to open the control air feeding of another piston 26.

For the control of the piston and of a color change, only the feeding of the control air requires a control. An automatic control requires thus only a comparatively low expense and the adjusting time periods are rather extremely low during a color change.

Referring now again to the drawings, and in particular to FIG. 3, the embodiment of the atomizer for electrostatic spraying disclosed therein differs from the spray pistol disclosed in FIGS. 1 and 2 substantially, merely by another design of the head and, by the fact, that, due to the high pressure at the head, the nozzle stock, the nozzles, the tubes connecting the head with the body, the bodies, etc. do not consist of metal, but rather of an electrically non-conducting material, for instance, synthetic material.

As can be ascertained from FIG. 3, an air nozzle 151 is mounted on the nozzle stock 101 by means of a cap-nut 150 made of synthetic material, which air nozzle 151 has a chamber 152 open towards the nozzle stock 101. A color nozzle 108, which is screwed into a threaded bore and concentrically disposed to the bore 102 feeding the color and the nozzle bore 109 of which forms the continuation of the bore 102, is designed at its outer shape such that, between its conically shaped end face and the following cylindrical jacket face, on the one hand, as well as the wall of the chamber 152 disposed opposite to these faces, on the other hand, an intermediate chamber is formed, through which air can flow from the chamber 152 to a mixing nozzle 153 provided in the end face of the air nozzle. In the mixing nozzle 153 the color material emerging from the nozzle bore 109 is admixed for starting the atomization.

The air nozzle 151 has at its free end side two projecting, diametrically oppositely disposed lugs 154 and 154', in each of which a bore 155 and 155', respectively, is disposed. These bores are in communication, on the one hand, with the air channels 105 of the nozzle stock 101, and on the other hand, with the outer air by means of channels 156 and 156', respectively, which are directed such, that the pressure air emerging therefrom continues the atomization of the spray emerging from the mixing nozzle 153 and renders the latter to a flat shape.

The widened portion of the chamber 152 pointing toward the nozzle stock 101 is surrounded by an electrically conducting ring 157 which is made, for instance, of brass, with which metal strips 158 and 158', respectively, equipped with points and projecting into the bores 155 and 155', are electrically connected. Electrodes 160 and 160', respectively, which sink into bores 159 and 159', respectively, engage the strips 158 and 158', respectively.

The ring 157 is disposed at the buckling point of a contact 161 disposed in the nozzle stock 101 and bent in form of an angle, one arm of the contact 161 extending into the bore 102 and the other arm into a recess 162 of the nozzle stock 101. In this recess 162, into which a tube 163 is inserted, the contact 161 engages a contact ball 164, which is under the effect of a helical spring 165. In the chamber surrounded by the helical spring 165, a current limiting resistance (not shown) is inserted, which engages the ball 164 with one and with its other end a high-voltage feed.

The other parts of the atomizer are formed in principle in the same manner as in the spraying pistol disclosed in FIGS. 1 and 2 and, for this reason, the details of such structure are not repeated for the second embodiment.

If the contact 161 feeds a high voltage, the color to be atomized already is electrostatically charged prior to the entrance into the color nozzle 108 by means of the arm projecting into the bore 102. Furthermore, by the edges of the ring 157 and the edges and points of the strips 158 and 158', the pressure air fed thereto is ionized. This causes an effect according to which already during the atomizing in the mixing nozzle 153 and, consequently, during the further atomizing and forming of the spray by the pressurized air emerging from the bores 156 and 156', individual particles of the color are electrically charged by ions of the ionized air. One obtains thereby a very intensive electrical charge. An additional ionization is brought about by the electrodes 160 and 160'. The control of the feeding of color and of atomizing air, as well as a color change takes place in the same manner as described in connection with the embodiment disclosed in FIGS. 1 and 2.

While I have disclosed several embodiments of the present invention, it is to be understood that these embodiments are given by example only and not in a limiting sense, the scope of the present invention being determined by the objects and the claims.

I claim:

1. An apparatus for selective volatilization and application of different substances, particularly of powdered or liquid substances of different colors, comprising a nozzle head including at least one first nozzle for atomizing air and at least one second nozzle for the outlet of the substances to be atomized, a plurality of feeding conduits for different substances selectively connectable with said second nozzle, a feeding channel coordinated and connected to the corresponding of said feeding conduits and operatively communicating with said second nozzle, means including control valves selectively opening one of said feeding channels and leaving the remaining channels closed, each of said control valves including a piston, an atomizing air feeding conduit, operatively communicating with said first nozzle, a valve disposed in the latter and including a spindle, means for coupling each of said pistons with said spindle for simultaneous operation of said valve therewith, regardless of the position of the other of said pistons, and said nozzle head defining a bore communicating with said feeding channels and with said second nozzle, and said nozzle head via said bore and said first nozzle receiving substantially simultaneously selective feed of material from said feeding conduit and feed of atomizing air, respectively.

2. The apparatus, as set forth in claim 1, wherein said control valves are disposed adjacent to the end of said feeding channels pointing toward said second nozzle.

3. The apparatus, as set forth in claim 1, wherein each of said feeding channels comprises a first channel portion disposed in said nozzle head and a tube, which includes a connecting flange, and said tube connects said first channel portion with said connecting flange.

4. The apparatus, as set forth in claim 3, wherein the end of said first channel portion pointing toward said tube forms a seat of said control valve, and a valve spindle of said control valve extends through said tube.

5. The apparatus, as set forth in claim 4, wherein said valve spindle comprises a needle, said piston operatively connected with said needle, a spring engaging said piston and urging said needle into a control valve closing position, and air pressure means for displacing said piston against the force of said spring.

6. The apparatus, as set forth in claim 1, wherein said coupling means includes, a coupling device comprising a plate axially immovable on said spindle of said valve, a return spring for said spindle, and rod means engageable with said plate and axially immovably connected with said pistons.

7. The apparatus, as set forth in claim 1, which includes an additional spring connecting each of said pistons with the corresponding of said needles.

References Cited

UNITED STATES PATENTS

| 1,682,037 | 8/1928 | Craig. |
| 2,564,392 | 8/1951 | Burrucker _____ 239—415 X |
| 2,878,063 | 3/1959 | Kish et al. |
| 3,135,467 | 6/1964 | Greenman. |

FOREIGN PATENTS

| 165,258 | 11/1905 | Germany. |
| 429,275 | 5/1935 | Great Britain. |

M. HENSON WOOD, Jr., Primary Examiner

B. BELKIN, Assistant Examiner

U.S. Cl. X.R.

239—290, 416.1, 417.5, 428